(12) United States Patent
Camacho

(10) Patent No.: US 7,165,772 B1
(45) Date of Patent: Jan. 23, 2007

(54) SELF-LOCKING SEAL RING

(76) Inventor: Luis A. Camacho, 10575 SW. 12th Manor, Pembroke Pines, FL (US) 33025-3576

( * ) Notice: Subject to any disclaimer, the term of this patent is extended or adjusted under 35 U.S.C. 154(b) by 59 days.

(21) Appl. No.: 10/977,371

(22) Filed: Oct. 29, 2004

(51) Int. Cl.
*B60T 11/236* (2006.01)

(52) U.S. Cl. .................................................. 277/496

(58) Field of Classification Search ........ 277/496–499, 277/546, 547
See application file for complete search history.

(56) References Cited

U.S. PATENT DOCUMENTS

| | | | | |
|---|---|---|---|---|
| 1,271,077 A | * | 7/1918 | Probasco | ..................... 277/499 |
| 2,485,862 A | * | 10/1949 | Caza | ......................... 277/496 |
| 4,533,149 A | * | 8/1985 | Vater et al. | .................. 277/499 |
| 4,844,487 A | | 7/1989 | Eakin | |
| 5,513,857 A | * | 5/1996 | Watanabe et al. | ........... 277/469 |

\* cited by examiner

*Primary Examiner*—Patricia Engle
*Assistant Examiner*—Gilbert Lee
(74) *Attorney, Agent, or Firm*—Michael I Kroll

(57) ABSTRACT

A self-locking seal ring is disclosed. The self-locking seal ring includes a ring body having a tab end segment on one end and a channel end segment on the opposite end. A lock tab is provided on the tab end segment, and a lock channel is provided on the channel end segment for receiving the lock tab. The self-locking seal ring is easy to install in a ring groove in a main butterfly plate of a butterfly valve, for example, and facilitates optimum sealing of the main butterfly plate with respect to the butterfly valve housing.

5 Claims, 2 Drawing Sheets

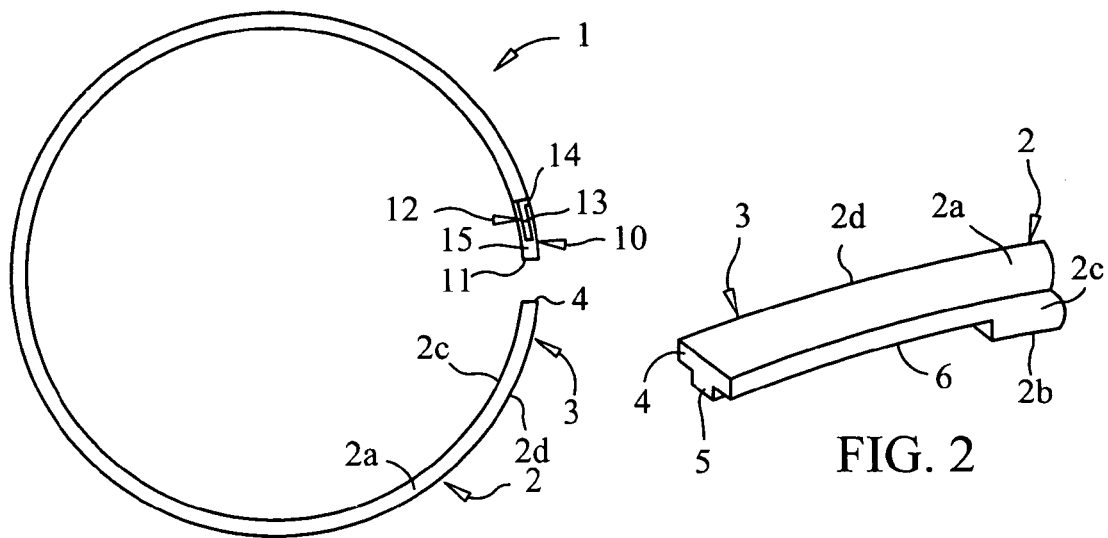
FIG. 1
FIG. 2
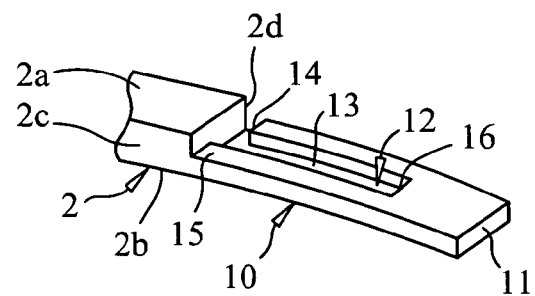
FIG. 3
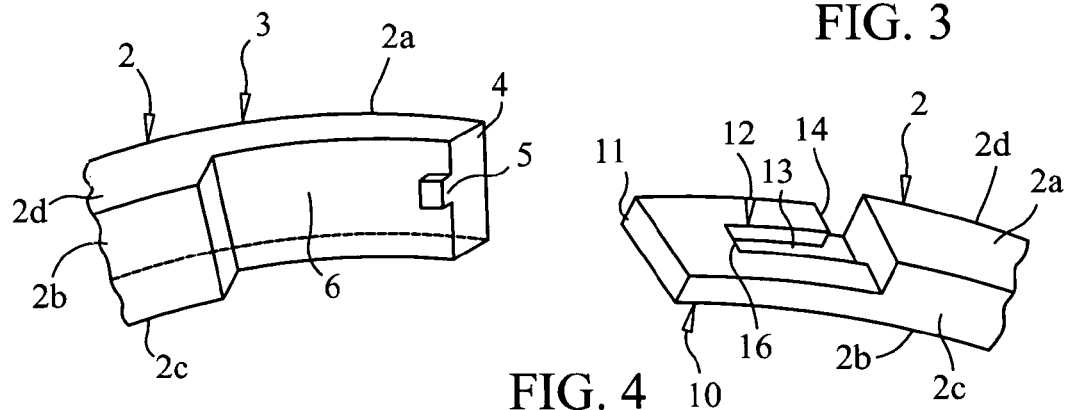
FIG. 4
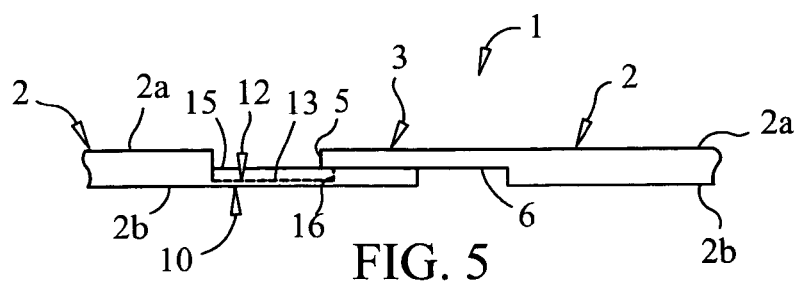
FIG. 5

SELF-LOCKING SEAL RING

FIELD OF THE INVENTION

The present invention relates generally to seal rings for sealing butterfly valves particularly in aerospace applications. More particularly, the present invention relates to a novel self-locking seal ring which is easily installed in a ring groove of a butterfly valve and effectively seals the valve to improve leakage control.

BACKGROUND OF THE INVENTION

Butterfly valves are extensively used in the bleed air, pneumatic and air conditioning systems of most modern aircraft. In the aircraft industry, seal rings are frequently used in butterfly valves that are typically not very reliable due to the nature of the environment in which they must operate. Most butterfly valve applications demand good leakage control at high and low pressures as well as optimum performance over a large range of operating temperatures.

Butterfly valves typically include a valve housing within which is disposed a rotating main butterfly plate. A seal ring is seated in a seal ring groove that is provided in the periphery of the plate. As the plate rotates between open and closed positions, the seal ring engages the inside surface of the valve housing to seal the edges of the plate with respect to the valve housing. Proper installation of the seal ring/butterfly plate combination inside the bore of the valve housing is critical since the plate must be perfectly aligned to the bore of the valve body to allow proper butterfly plate rotation. This assembly process is time-consuming and increases the labor hours during valve overhaul.

A typical aircraft pneumatic system includes several butterfly valves to control bleed air regulation and shut-off. Butterfly valves accomplish this function by regulating or completely shutting off the airflow or other fluid flow in a given duct system. When the butterfly valve functions as a regulating valve, the main butterfly plate must oscillate between open and closed positions during flight. This regulation is used to increase or decrease the demand of air for the system and simultaneously maintain a constant pressure within the duct. When the butterfly valve functions as a shutoff valve, the main butterfly plate is used to completely open the air flow or completely block air flow in a desired section of the duct system. In this case, leakage control across the butterfly plate becomes very important. If a valve fails, depending on its location, it can render the bleed system and its accessories inoperative.

As the main butterfly plate rotates in the valve housing, pressure acting on the surface of the plate causes the seal ring to move inside the seal ring groove. This movement constantly changes the orientation of the ring relative to the plate. Since the typical system has high pressure on one side and low pressure on the opposite side of the plate, if the ring ends are not secured to the plate or if the ring has a "self-locking" mechanism, pressure can cause the ring to "blow-out" of the groove. If the ring ends are deflected from their normal operating condition in the groove, as the butterfly plate moves, it can cause the valve to lock up by wedging the ring between the clearance of the outside and inside diameters of the valve body.

Manufacturers of butterfly valves utilize various methods of securing the seal ring to the main butterfly plate. The most common method is to drill slots on the side faces of the seal ring and match these slots with drilled holes on the side wall of the plate. A wire sized to fit into these holes is driven across both the plate and the ring. The typical shape of this wire resembles a staple. Once this staple is installed, the ends are bent in opposite directions to ensure ring end retention. This method, while effective in securing the ring, results in high leakage across the seal/plate assembly. Most of the time, the rings have straight cut joints which are not optimally effective to control leakage.

As it wears during operation, the seal ring eventually no longer rotates relative to the plate due to the locking staple. This rotation is known as ring "walking". As the ring is now locked in place, it starts wearing at both extremes closest to the axis of rotation of the main butterfly plate, thus further increasing leakage across the plate.

Another method of securing the seal ring to the main butterfly plate involves the use of a small-diameter dowel pin that rides inside the gap of the seal ring. This dowel pin is press-fitted into the main butterfly plate. The typical location of the pin is at the axis of rotation of the plate where ring "walking" is negligible. While this solution appears to be simple, it also has disadvantages. The major disadvantage of the method is looseness of the press fit of the pin. If the pin is lost, it can travel downstream of the valve, causing damage to other components of the system or to the valve itself. Loosing the pin will cause the ring to walk; thus, ring blow-out is eminent. As with the staple, this method also causes the ring to wear at the areas closest to the axis of rotation of the butterfly plate, thus causing leakage to increase.

One of the most effective methods of ring retention involves the use of a self-locking ring. An example of such a self-locking ring is the self-locking seal ring available from the Kaydon Corporation of Muskegon, Mich. The Kaydon Corp. self-locking seal ring has a latch structure of overlapping, interengaging surfaces inclined to the ring's axis. The inclined surfaces seat against each other and intersect only the outer circumferential face of the ring and one of the axial faces of the ring at a location spaced radially outwardly from the inner radial face of the ring. The axial opening through the ring at the center of the overlap is entirely surrounded by portions of the outer circumferential face of the ring.

Due to the intricate shape of the locking feature of the Kaydon Corp. self-locking ring, the ring cannot be installed inside a normal machined groove. Instead, the butterfly plate must have a removable sector to allow its installation and proper "hooking" action between the ends of the ring. The ring is free to "walk" in the groove during valve operation, thus distributing wear around its circumference. It has been found that leakage control of the ring is better than previous cases, although the biggest disadvantage of the ring is the special provisions the butterfly plate must have to facilitate its installation. For example, the removable sector must be manufactured separately from the rest of the plate. During assembly, the plate must match perfectly to the contour of the rest of the plate to allow smooth plate rotation. Additionally, provisions must be made to control leakage at the interfacing surfaces of the removable sector with the butterfly plate. Assembly procedures become cumbersome, time-consuming and expensive.

Another example of a self-locking seal ring is manufactured by Cook Airtomic, a division of the Dover Corporation. The locking mechanism of this seal ring is shown in FIG. 9 of the drawings. The seal ring is known as a "double-hook joint ring" or PDS ring. Like the designs of other types of seal rings used to seal butterfly valves, this seal ring design requires special considerations during its installation, although testing and service life have shown this seal ring to be very effective and efficient. However, a common drawback of the seal ring is the difficult installation of the ring into the ring groove in a butterfly valve housing. A Marcel spring is sometimes used to keep the ring centered once installed in the ring groove. Sometimes, a special installation tool is required to install the ring.

There is therefore an established need for a self-locking seal ring which is easy to install in a ring groove of a main butterfly plate and facilitates optimum sealing of the butterfly plate with respect to the butterfly valve housing.

SUMMARY OF THE INVENTION

The present invention is directed to a self-locking seal ring which is suitable for sealing butterfly valves in aircraft, aerospace and other applications; is easy to install in a ring groove in a main butterfly plate of a butterfly valve; and facilitates optimum sealing of the main butterfly plate with respect to the butterfly valve housing.

An object of the present invention is to provide a self-locking seal ring which facilitates an effective seal between a main butterfly plate and a valve body of a butterfly valve.

Another object of the present invention is to provide a self-locking seal ring that may be used in a variety of industries, including but not limited to the aircraft and aerospace industries, to effectively seal a main butterfly plate with respect to a valve body of a butterfly valve.

Still another object of the present invention is to provide a self-locking seal ring that is resistant to "walking" and "blowing out" during extended use.

Yet another object of the present invention is to provide a self-locking seal ring which can be used with a second inner ring to form a seal ring set that effectively controls leakage in a butterfly valve.

A still further object of the present invention is to provide a self-locking seal ring which includes a generally circular ring body having a lock tab on one end and a lock channel in the other end, which lock channel receives the lock tab to secure the seal ring in a functional, sealing position when the seal ring is seated in a ring groove of a main butterfly plate of a butterfly valve.

Yet another object of the present invention is to provide a self-locking seal ring which contributes to operational longevity of a butterfly valve.

A still further object of the present invention is to provide a self-locking seal ring which is easy to install in and remove from a butterfly valve to expedite and simplify maintenance of the butterfly valve.

These and other objects, features and advantages of the present invention will become more readily apparent from the attached drawings and the detailed description of the preferred embodiments, which follow.

BRIEF DESCRIPTION OF THE DRAWINGS

The invention will be further understood, by way of example, with reference to the accompanying drawings, in which:

FIG. 1 is a top view of a self-locking seal ring according to the present invention, with the ends of the seal ring shown in an unfastened configuration;

FIG. 2 is a top perspective view of a tab end segment of the self-locking seal ring of FIG. 1;

FIG. 3 is a top perspective view of a channel end segment of the self-locking seal ring of FIG. 1;

FIG. 4 is an exploded bottom perspective view of the tab end segment and channel end segment of the self-locking seal ring, with the end segments unfastened from each other;

FIG. 5 is an edge view of the tab end segment and the channel end segment of the self-locking seal ring, with the end segments fastened to each other;

DETAILED DESCRIPTION OF THE PREFERRED EMBODIMENTS

Figure 6:
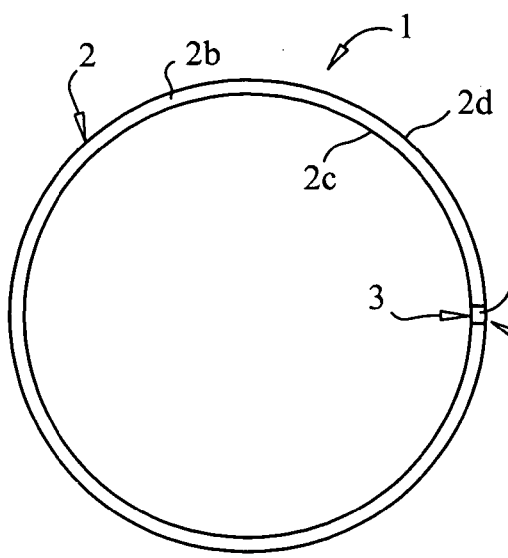
FIG. 6 is a bottom view of the self-locking seal ring, with the tab end segment and the channel end segment fastened to each other.
Figure 7:
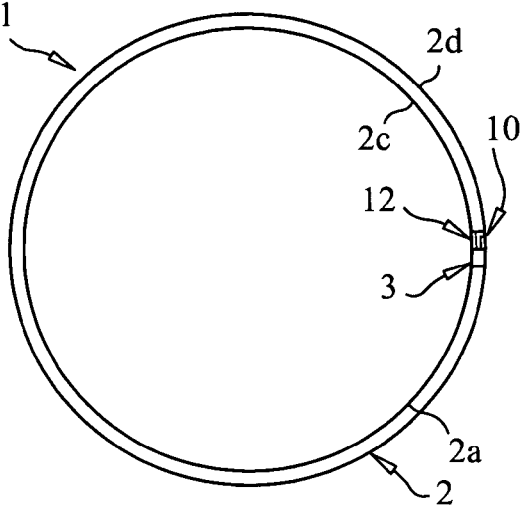
FIG. 7 is a top view of the self-locking seal ring, with the tab end segment and the channel end segment fastened to each other.

Shown throughout the drawings, the present invention is generally directed towards a self-locking seal ring which is suitable for sealing butterfly valves in aircraft, aerospace and other applications; is easy to install in a ring groove in a main butterfly plate of a butterfly valve; facilitates optimum sealing of the main butterfly plate with respect to the butterfly valve housing; and facilitates ease in maintenance of a butterfly valve.

Initially referring to FIGS. 1–4, an illustrative embodiment of the self-locking seal ring of the present invention is generally indicated by reference numeral 1. The seal ring 1 includes a generally circular ring body 2 which is manufactured from a variety of known materials, most typically steel alloys. For purposes of description herein, the ring body 2 includes an upper surface 2a and a lower surface 2b. However, it will be understood that the upper surface 2a and lower surface 2b of the ring body 2 are simply opposite surfaces of the seal ring 1 and need not necessarily be disposed in upper and lower positions, respectively, when the seal ring 1 is installed in a butterfly valve (not illustrated) in use of the seal ring 1, but may be disposed in any positions which are consistent with the use requirements of the seal ring 1. The ring body 2 further has an inner edge 2c (inside diameter) and an outer edge 2d (outer diameter). A tab end segment 3 and a channel end segment 10 terminate opposite ends of the ring body 2 and are releasably attached to each other to secure the seal ring 1 in a functional position, as will be hereinafter described.

As illustrated in FIGS. 2 and 4, the tab end segment 3 typically has a "stepped" profile and includes a recessed surface 6 which is typically machined in the lower surface 2b of the ring body 2. The tab end segment 3 has a tab end 4. A lock tab 5, which is smaller than the radial width of the tab end segment 3, extends from the recessed surface 6. The lock tab 5 is typically substantially equidistant between the inner edge 2c and outer edge 2d of the ring body 2, and is typically flush with the tab end 4.

As illustrated in FIGS. 3 and 4, the channel end segment 10, like the tab end segment 3, typically has a "stepped" profile which is generally complementary to that of the tab end segment 3 and includes a recessed surface 15 which is typically machined in the upper surface 2a of the ring body 2. The channel end segment 10 has a channel end 11. A generally "L"-shaped lock channel 12 is typically machined in the recessed surface 15 and includes an elongated main segment 13, which is typically substantially equidistant between the inner edge 2c and outer edge 2d of the ring body 2. The radial position of the main segment 13 substantially corresponds to the radial position of the lock tab 5 in the ring body 2. Furthermore, the width of the main segment 13 is only slightly larger than the width of the lock tab 5 to accommodate the lock tab 5 in a secure fit, as will be hereinafter described. The lock channel 12 further includes a radially-extending insert segment 14 which is generally perpendicular to the main segment 13. The insert segment 14 communicates with the main segment 13 and extends radially to the outer edge 2d of the ring body 2. Alternatively, the insert segment 14 may communicate with the main segment 13 and extend to the inner edge 2c of the ring body 2. A lock surface 16 terminates the extending end of the main segment 13 which is opposite the end of the main segment 13 that communicates with the insert segment 14.

Figure 8:
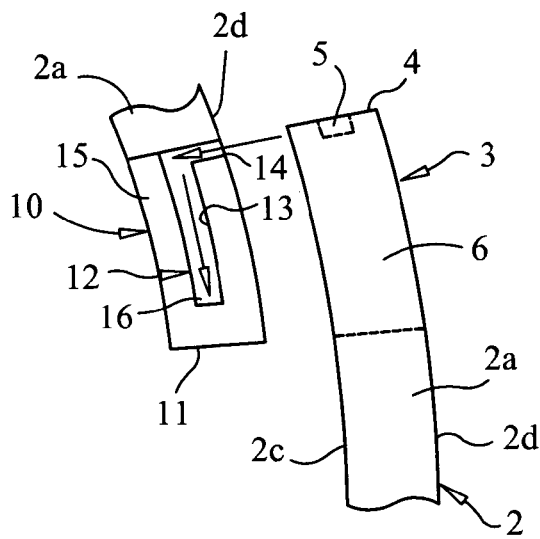
FIG. 8 is a top view of the tab end segment and the channel end segment of the self-locking seal ring, illustrating insertion of the lock tab of the tab end segment in the lock channel of the channel end segment to secure the self-locking seal ring in the functional configuration.
Figure 9:
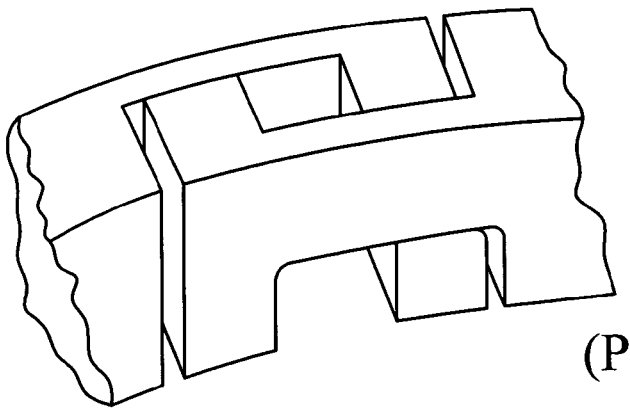
FIG. 9 is a perspective view of a conventional self-locking seal ring, with the ends of the seal ring fastened together.

Referring next to FIGS. 5–8, in typical use the self-locking seal ring 1 is used to seal a main butterfly plate (not illustrated) in a butterfly valve housing (not illustrated). These features of butterfly valves are well-known to those skilled in the art and require no additional description. Accordingly, with the tab end segment 3 and channel end segment 10 unfastened from each other, the ring body 2 is initially installed in a ring groove (not illustrated) in the butterfly plate by spiraling the ring body 2 into the ring groove. Once the ring body 2 is inserted in the ring groove, the tab end segment 3 is releasably fastened to the channel end segment 10 to secure the seal ring 1 in the annular, functional configuration. This is accomplished by initially deforming the ring body 2 in such a manner that the tab end segment 3 is located outside of and substantially adjacent to the channel end segment 10 of the ring body 2, as shown in FIG. 8. In the embodiment (not illustrated) of the seal ring 1 in which the insert segment 13 of the lock channel 12 communicates with the inner edge 2c of the ring body 2, the tab end segment 3 is positioned inside the channel end segment 10. Next, the lock tab 5 on the tab end segment 3 is slidably inserted into the insert segment 14 of the lock channel 12 on the channel end segment 10, as indicated in FIG. 8. The ring body 2 is next allowed to recoil, such that the lock tab 5 is pulled along the main segment 3 of the lock channel 12 and finally engages the lock surface 16, as further indicated in FIG. 8 and illustrated in FIG. 5. Thus, engagement of the lock tab 5 against the lock surface 16 prevents further recoil and diametrical expansion or enlargement of the ring body 2. This radial expansion of the ring body 2 also facilitates firm seating of the ring body 2 in the ring groove of the main butterfly plate. Therefore, once the lock tab 5 rides in the main segment 13 of the lock channel 12, the lock tab 5 forms a radial locking feature with the lock surface 16. Furthermore, because the width of the main segment 13 of the lock channel 12 is only slightly larger than the width of the lock tab 5, the main segment 13 has minimal clearance on both sides of the lock tab 5. Thus, the main segment 13 accommodates the lock tab 5 in a secure fit which prevents lateral or radial movement of the tab end segment 3 and channel end segment 10 with respect to each other. Therefore, positive locking of the seal ring 1 in the radial direction is achieved. The self-locking seal ring 1 can be unlocked by diametrically compressing the ring body 2 to slide the lock tab 5 along the main segment 13 and then by sliding the lock tab 5 radially along the insert segment 14 of the lock channel 12, respectively, in the directions which are opposite those indicated by the arrows in FIG. 8. This facilitates removal of the self-locking seal ring 1 from the ring groove of the butterfly valve for maintenance or replacement purposes, for example.

It will be appreciated by those skilled in the art that a self-locking seal ring 1 can be used with an inner ring as a ring set in the butterfly valve, according to the knowledge of those skilled in the art. In this configuration, the seal ring 1 enhances leakage control. Furthermore, no special provisions or tools are required to install the seal ring 1 into a ring groove of a butterfly valve. Additionally, the main butterfly plate of the butterfly valve does not require special features to accommodate the design of the seal ring 1. As the self-locking seal ring 1 operates, it is allowed to "walk" in the ring groove and the housing bore of the butterfly valve housing, thus distributing wear around the entire circumference of the seal ring 1 and housing bore.

While the preferred embodiments of the invention have been described above, it will be recognized and understood that various modifications can be made in the invention and the appended claims are intended to cover all such modifications which may fall within the spirit and scope of the invention.

What is claimed is:

1. A self-locking seal ring comprising:
   a ring body having first and second ends, said ring body having first and second side edges, inner and outer annular surfaces, and each of said first and second ends terminating in an end surface;
   a tab end segment provided on said first end of said ring body comprising a stepped down portion from said first side edge;
   a lock tab provided on said stepped down portion of said tab end segment, said stepped down portion of said tab end segment extending to said first side edge and said lock tab having a surface flush with the end surface of said first end; and
   a channel end segment having a lock channel provided on said second end of said ring body for receiving said lock tab, said second end having a step down portion from said second side edge and said lock channel formed in said step down portion, said lock channel being L-shaped with a first leg parallel with and spaced from said inner and outer annular surfaces terminating before said second end surface and a second leg extending from an end of said first leg adjacent a shoulder from which the stepped down portion begins on said second end at right angles to said first leg and exiting through said outer annular surface, said first leg of said lock channel having side walls substantially parallel to the inner and outer annular surfaces.

2. The self-locking seal ring of claim 1 wherein said first leg of said lock channel is substantially midway between said inner and outer annular surfaces.

3. A self-locking seal ring comprising:
   a ring body having first and second ends and opposite first and second body surfaces;
   a tab end segment provided on said first end of said ring body, said tab end segment having a recessed surface in said first ring body surface;
   a lock tab provided on said recessed surface of said tab end segment;
   a channel end segment provided on said second end of said ring body, said channel end segment having a recessed su in said second ring body surface; and
   an L-shaped lock channel provided in said recessed surface of said channel end segment for receiving said lock tab whereby said lock tab slides into a first leg of said lock channel through the first ring body surface and enters a second leg of said lock channel having side walls extending parallel to and spaced from said body surfaces, said second leg terminating before said second end of said ring body so that said lock tab makes an L-shaped movement through said first second legs in succession to lock said ring body.

4. The self-locking seal ring of claim 3 wherein said lock tab is substantially equidistant between said first and second body surfaces of said ring body.

5. The self-locking seal ring of claim 4 wherein the first leg of said lock channel is adjacent a shoulder from which said recessed surface extends.

* * * * *